United States Patent
Goto et al.

(10) Patent No.: US 6,825,896 B2
(45) Date of Patent: Nov. 30, 2004

(54) LIGHT GUIDE PLATE AND DISPLAY DEVICE

(75) Inventors: Youichiro Goto, Gifu (JP); Toru Nose, Gifu (JP); Hiroshi Yamashita, Aichi (JP); Yoshiaki Maeno, Gifu (JP); Masahiro Higuchi, Gifu (JP)

(73) Assignee: Sanyo Electric Co., Ltd., Osaka (JP)

( * ) Notice: Subject to any disclaimer, the term of this patent is extended or adjusted under 35 U.S.C. 154(b) by 71 days.

(21) Appl. No.: 10/379,791

(22) Filed: Mar. 6, 2003

(65) Prior Publication Data

US 2003/0169386 A1 Sep. 11, 2003

(30) Foreign Application Priority Data

Mar. 6, 2002 (JP) ........................................ 2002-060943

(51) Int. Cl.$^7$ ............................................ G02F 1/1335
(52) U.S. Cl. ............................................ 349/65; 362/31
(58) Field of Search ............................... 349/65; 362/31

(56) References Cited

U.S. PATENT DOCUMENTS 5,394,308 A * 2/1995 Watanabe et al. ............. 362/31
5,931,555 A * 8/1999 Akahane et al. ............... 362/31
5,949,505 A * 9/1999 Funamoto et al. ............. 349/65

FOREIGN PATENT DOCUMENTS

JP          2001-272505         10/2001

* cited by examiner

Primary Examiner—James A. Dudek
(74) Attorney, Agent, or Firm—Arent Fox, PLLC.

(57) ABSTRACT

A display device includes a light guide plate. A light incident on the light guide plate from a linear light source is reflected by a reflecting surface of each of prisms and emitted from a lower surface of the light guide plate. The emitted light is irradiated onto a liquid crystal panel, reflected by a reflecting layer provided within the liquid crystal panel and advances toward a front direction of a screen. Herein, the light guide plate has on its lower surface as an emission surface a number of minute protrusions each having a shape of triangle in vertical cross-section in a manner that the protrusions cover with no space therebetween a whole effective area of the lower surface, and thereby to obtain an antireflection effect.

8 Claims, 7 Drawing Sheets

LIGHT GUIDE PLATE AND DISPLAY DEVICE

BACKGROUND OF THE INVENTION

1. Field of the Invention

The present invention relates to a light guide plate and a display device. More specifically, the present invention relates to a light guide plate formed on its surface with a plurality of protrusions each having a cross-section shape that a width is made gradually narrower with a pitch shorter than a wavelength of a light, and a display device provided with the light guide plate.

2. Description of the Prior Art

As a display device provided with a light guide plate, there is, for example, a liquid crystal display device 1 shown in FIG. 13. The liquid crystal display device 1 includes a linear light source 2, a light guide plate 3 placed in a state one side surface 3a thereof is along a longitudinal direction (a front and back direction of the paper in FIG. 13) of the linear light source 2 and a reflective type liquid crystal panel 4 placed below a lower surface 3b of the light guide plate 3.

The light guide plate 3 is, on its upper surface 3c, formed with a number of linear prisms 5 in parallel with the side surface 3a. Each of the prisms 5, 5, . . . has a chevron-shape in cross-section in a longitudinal direction, and each slope 5a away from the side surface (right side in FIG. 13) out of two slopes 5a and 5b forming each prism functions as a reflecting surface. More specifically, a light incident on the light guide plate 3 from the linear light source 2 through the side surface 3a is reflected by each of the reflecting surfaces 5a and emitted from the lower surface 3b of the light guide plate 3 as shown by a dotted arrow 6 in FIG. 13. Then, the emitted light is irradiated onto the liquid crystal panel 4, reflected upwardly by a reflecting layer 4a provided at a bottom of the liquid crystal panel 4, and then emitted from the upper surface (prism surface) 3c through the light guide plate 3.

However, when the light reflected by the above-described reflecting surface 5a is emitted from the lower surface 3b, a part of the light is reflected (Fresnel-reflected) by the lower surface 3b as shown by one dotted arrow 6a in FIG. 13 and emitted from the upper surface 3c without passing through the liquid crystal panel 4. Thereupon, in the light emitted from the upper surface 3c there are, in a mixed manner, a light 6 originally passing through the liquid crystal panel 4 and a light 6a not passing through the liquid crystal panel 4, and consequently, it causes a so-called white blur and/or a decrease of a contrast of a screen.

Thus, in a prior art (1), forming an antireflection film on the lower surface 3b of the light guide plate 3 decreases an amount of the reflected light at the lower surface 3b and thus reduces an influence on image quality due to the reflected light 6a. It is noted that a multi-layered film formed by alternately laminating a low refractive layer formed of a low refractive material such as silicon dioxide ($SiO_2$) and etc. and a high refractive layer formed of a high refractive material such as titanium dioxide ($TiO_2$) and etc. is often utilized as the antireflection film.

On the other hand, as the prior art (2) for decreasing a surface reflection in the above-described optical component, there is known a technique for providing minute concaves and convexes on a surface of an optical component. More specifically, a number of cone-shaped protrusions 7 are formed on a surface of the optical component as shown in FIG. 14, for example. Herein, it is known that if a space of each of the protrusions 7, 7, . . . (corresponding to a diameter of a bottom of each of the protrusions 7), i.e. a pitch P' is made smaller than a wavelength of a light transmitted through the optical component, an antireflection effect can be obtained with respect to the light having that wavelength. The antireflection effect is improved as a ratio of a height H' to a pitch P' of each protrusion 7, i.e., an aspect ratio S' (=H'/P') is made large. Accordingly, also by forming these protrusions 7 on the lower surface 3b of the light guide plate 3 in FIG. 13, it is possible to decrease the light reflection by the lower surface 3b and reduce the influence on the image quality due to the reflected light 6a. It is noted that an example of a method for forming these cone-shaped protrusions 7, 7, . . . is disclosed in a Japanese Patent Laying-open No. 2001-272505 [G02B 1/11] laid-open on Oct. 5, 2001.

However, in the prior art (1), there are problems that hermeticity between the light guide plate 3 (lower surface 3b) and the antireflection film is decreased due to a change of an environment such as temperature, humidity and etc. and whereby, the antireflection film is released from the light guide plate 3 and a microcrack is generated on the antireflection film.

On the other hand, in the prior art (2), there is a problem that an antireflection effect cannot be sufficiently exerted. That is, since each protrusion 7 is conical in shape, there necessarily causes clearances 8, 8, . . . shown by oblique lines in FIG. 15 between each of the protrusions 7, 7, . . . . There are problems that an antireflection effect cannot be obtained at these clearances 8, 8, . . . and therefore, a sufficient antireflection effect cannot be obtained at a whole effective area (i.e., an area effectively irradiating a light onto the liquid crystal panel 4) of the lower surface 3b.

SUMMARY OF THE INVENTION

Therefore, it is a primary object of the present invention to provide a novel light guide plate and a display device.

It is another object of the present invention to provide a light guide plate and a display device capable of maintaining high endurance and improving image quality.

A first invention is a light guide plate characterized in that in a light guide plate formed on a surface thereof with a plurality of protrusions each having a cross-section shape that a width is made gradually narrower with a pitch shorter than a wavelength of a light, an interval or space between bases of adjacent protrusions is made uniform.

A second invention is characterized in that in a light guide plate formed on a surface thereof with a plurality of protrusions each having a cross-section shape that a width is made gradually narrower with a pitch shorter than a wavelength of a light, a ratio of a height of each of the plurality of protrusions to the pitch is made more than 1 and a total area of bottoms of the plurality of protrusions to an area of the surface is made more than 90%.

In the first invention, the light guide plate is formed with the plurality of protrusions on its surface. A width of the cross-section of each of the protrusions becomes gradually narrower. Furthermore, the pitch between the protrusions is shorter than the wavelength of the light. On the surface formed with such the protrusions, an antireflection effect can be obtained with respect to the light of the wavelength. In addition, since the interval or space between the bases of the adjacent protrusions is made uniform, the interval or space can be made narrower, that is, the interval or space between the adjacent protrusions can be made smaller. Therefore, it is possible to improve the antireflection effect.

Noted that it is desirable the interval or space described herein is zero. That is, if the protrusions are formed without intervals, a higher antireflection effect can be obtained.

Furthermore, it is desirable that a ratio of the height of each of the plurality of protrusions to the pitch is made more than 1. In this case, if the total area of the bottoms of the plurality of protrusions to the area of the surface formed with the protrusions is made more than 90%, a relatively high antireflection effect can be obtained.

In one embodiment of the present invention, each of the plurality of protrusions is formed in a pyramid shape.

In another embodiment of the present invention, each of the plurality of protrusions is formed in a linear manner.

In the second invention, a restriction that a ratio of the height of each of the plurality of protrusions to the pitch is more than 1 and a restriction that the total area of the bottoms of the plurality of protrusions to the area of the surface is more than 90% are imposed, so that a relatively high antireflection effect can be obtained.

The light guide plates according to these inventions can be applied to a display device.

According to the first invention, since it is possible to make a clearance between adjacent protrusions smaller, it is possible to obtain a higher antireflection effect than in the prior art (2) and to also reduce degradation of image quality due to an undesirable light reflection. In addition, there is no need to provide the antireflection film shown in the prior art (1), it is possible to obtain high endurance. That is, it is possible to improve the image quality while maintaining high endurance.

According to the second invention, since a ratio of the height of each of the protrusions to the pitch is restricted and a total area of the protrusions is restricted, a higher antireflection effect can be obtained than in the prior art (2). Furthermore, there is no need to provide the antireflection film shown in the prior art (1). Consequently, the second invention also yields high endurance and improved image quality.

The above described objects and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
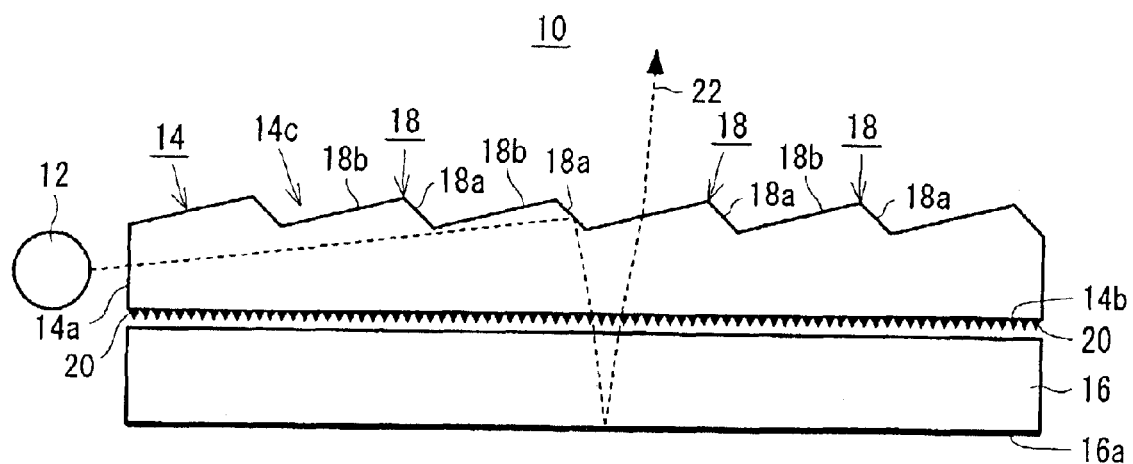
FIG. 1 is an illustrative view when viewing from a lateral direction a liquid crystal display device of a first embodiment of the present invention.

Referring to FIG. 1, a front light type liquid crystal display device 10 of a first embodiment includes a linear light source 12, a light guide plate 14 placed in a state one side surface 14a is along a longitudinal direction of the linear light source 12 and a plate-shaped liquid crystal panel 16 placed below a lower surface 14b of the light guide plate 14.

Herein, the linear light source 12 is, for example, a cold-cathode tube. Then, the light guide plate 14 is made of acrylic (PMMA) resin having transparency and formed on its upper surface 14c with a number of linear prisms 18 which extend in parallel with the side surface 14a. It is noted that each of the prisms 18 is shown in an enlarged manner for the sake of convenience of description, and therefore, the number of the prisms 18 shown in FIG. 1 is smaller than that of a product to which the present invention is actually embodied. More specifically, each prism 18 has a chevron-shape in cross-section in a longitudinal direction, and respective prisms 18, 18, . . . are successively formed such that adjacent prisms in a width direction come into contact with each other. It is noted that as described later, a slope 18a away from the side surface 14a of the light guide plate 14 out of two slopes 18a and 18b forming each prism 18 functions as a reflecting surface. The liquid crystal panel 16 is a reflective type having a reflecting layer 16a at its bottom and, although not shown in detail, is formed by laminating the reflecting layer 16a, a liquid crystal layer, a color filter, a glass substrate and a deflecting plate in this order on a glass substrate.

Figure 2:
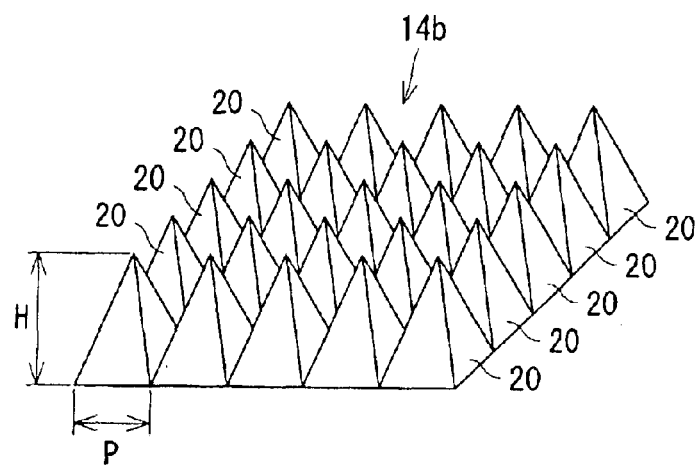
FIG. 2 is a perspective view showing in an enlarged manner a lower surface of a light guide plate in FIG. 1.
Figure 3:
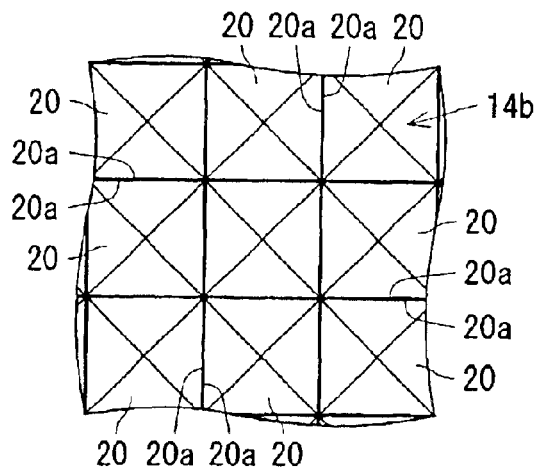
FIG. 3 is an illustrative view when looking up at the lower surface of the light guide plate in FIG. 2.

Furthermore, the light guide plate 14 has a number of protrusions 20 in pyramid shape shown in FIG. 2 formed on the lower surface 14b upside down. It is noted that FIG. 2 is opposite in up and down direction to FIG. 1. As shown in FIG. 2, the respective protrusions 20, 20, . . . are formed in a matrix fashion and are in closely contact with each other. More specifically, as shown in FIG. 3, with respect to adjacent protrusions 20 and 20, respective sides 20a and 20a of the bottoms are in closely contact with each other in a manner respective ends are aligned with each other.

It is noted that a bottom of each protrusion 20 is a square in shape. Then, a space or interval of the protrusions 20, 20, . . . (corresponding to one side of a bottom of the protrusion 20, herein), i.e. a pitch P is smaller than a wavelength λ (e.g., λ=350 [nm]–750 [nm]) of a light 22 transmitted through the light guide plate 14 and is, for example, 250 [nm]. Furthermore, a height H of each of the protrusions 20 is made as 250 [nm]. A ratio of the height H of each protrusion 20 to the pitch P, i.e., an aspect ratio S (=H/P) is made as 1. Such the protrusions 20, 20, . . . can be formed by a molding method such as injection molding. In addition thereto, these protrusions 20, 20, . . . can be formed by a machine work and a chemical work.

In the liquid crystal display device 10 thus structured, a light generated from the linear light source 12 follows a following track. That is, a light incident on the light guide plate 14 from the linear light source 12 through the side surface 14a is reflected by the slopes 18a, 18a, . . . shown by a dotted arrow 22 in FIG. 1 and emitted from the lower surface 14b of the light guide plate 14. Then, the emitted light is irradiated onto the liquid crystal display panel 16, reflected by the reflecting layer 16a through the above-described liquid crystal layer and then emitted from the upper surface 14c through the light guide plate 14.

Figure 14:
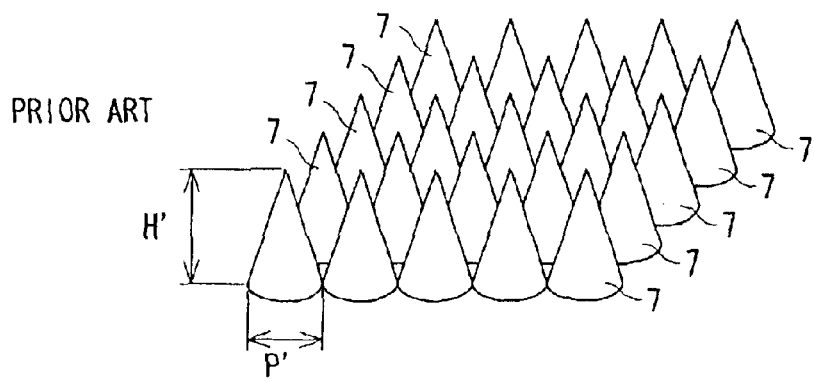
FIG. 14 is an illustrative view showing one example of a prior art.
Figure 15:
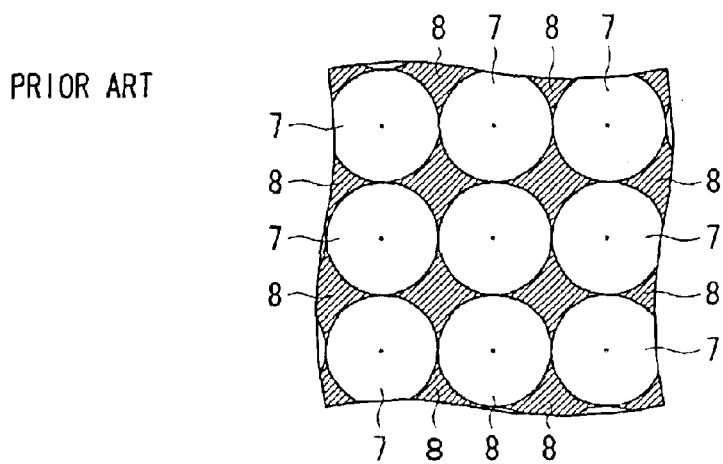
FIG. 15 is an illustrative view when viewing from another angle structure of the prior art in FIG. 14.

It is noted that the lower surface 14b being an emission surface of the light guide plate 14 is formed with the plurality of protrusions 20, 20, . . . , and therefore, an antireflection effect can be obtained at the lower surface 14b similar to the prior art(2) shown in FIG. 14. Accordingly, it is possible to prevent the light 22 reflected by the reflecting surfaces 18a, 18a, . . . from being reflected by the lower surface 14b, and reduce an influence (occurrence of white blur and decrease of contrast of a screen) on image quality due to the reflected light. The antireflection effect caused by providing these protrusions 20, 20, . . . is shown in FIG. 4 in a graphical manner.

Figure 4:
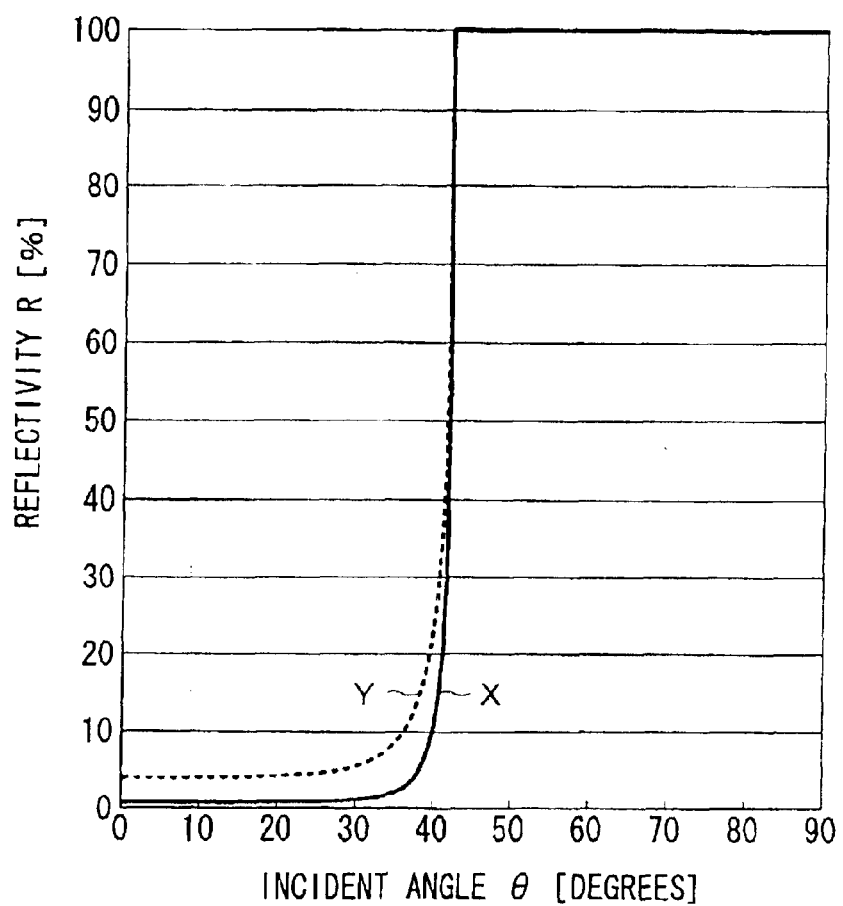
FIG. 4 is a graph showing a relationship between an incident angle on the lower surface of the light guide plate and a reflectivity in FIG. 1 embodiment.
Figure 13:
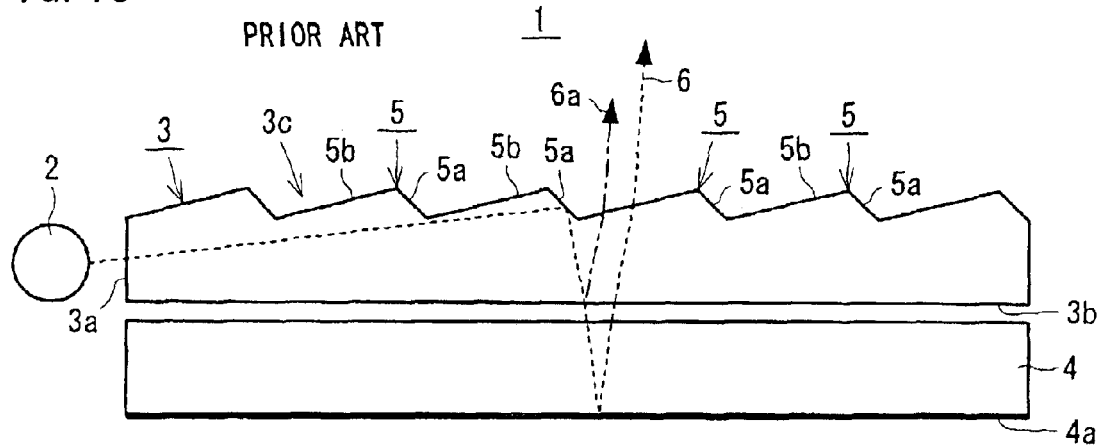
FIG. 13 is an illustrative view showing one example of a liquid crystal display device to which a prior art is applied.

In FIG. 4, a horizontal axis denotes an incident angle (an angle formed by a normal line of the lower surface 14b with the light 22) θ with respect to the lower surface 14b, and a vertical axis denotes a reflectivity (strictly, an average value within a range of wavelength λ 350 [nm]–750 [nm]) R at the lower surface 14b. Then, a curve X of a solid line indicates a relationship between the incident angle θ and the reflectivity R in the first embodiment. On the other hand, a curve Y of a dotted line indicates a relationship between the incident angle θ and the reflectivity R in a case no protrusion 20 is provided, i.e. in the above-described FIG. 13 structure. As can be understood from FIG. 4, it is obvious that providing the protrusions 20, 20, . . . yields the antireflection effect. For example, the light 22 having the incident angle θ of 0 degree (i.e., vertical incidence) yields the reflectivity R of about 4[%] in a case of no protrusion 20. On the contrary thereto, a direct incidence yields the reflectivity R equal to or less than 0.2[%] in a case of providing the respective protrusions 20, 20, . . . . It is noted that the incident light 22 with the incident angle θ more than 42 degrees of a critical angle yields the reflectivity R of 100[%], which is a so-called total reflection.

Figure 5:
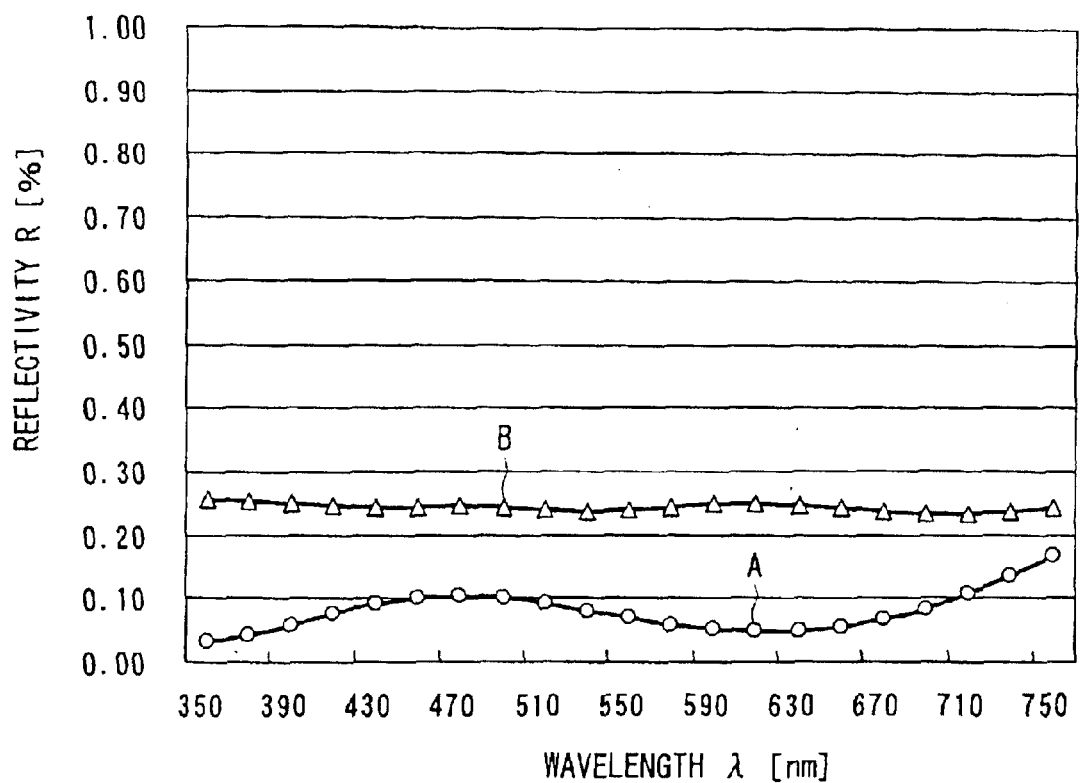
FIG. 5 is a graph showing a simulation result of the reflectivity with respect to wavelengths of lights on the lower surface of the light guide plate in FIG. 1 embodiment.

In addition, in the first embodiment, the protrusions 20, 20, . . . are pyramid in shape, formed in a matrix fashion and in closely contact with each other. That is, the whole of the lower surface 14b of the light guide plate 14 (strictly, a whole effective area of the lower surface 14b) is fully covered by the protrusions 20, 20, . . . with no spaces. Accordingly, the antireflection effect at the whole of the lower surface 14b is increased in comparison to the prior art (2). FIG. 5 shows a simulation result of how different is the reflectivity R of the lower surface 14b (or 3b) between the first embodiment and the prior art (2).

In FIG. 5, a horizontal axis indicates a wavelength λ of the light 22 incident on the lower surface 14b, and a vertical axis indicates a reflectivity R of the light (strictly, a vertically incident light) to the lower surface 14b. A line A plotted with circles (○) shows a relationship (for an aspect ratio S of 1) between the wavelength λ and the reflectivity R in the first embodiment. On the other hand, a plotted line B plotted with triangles (△) shows a relationship (for an aspect ratio S' of 3) between the wavelength λ and the reflectivity R in the prior art (2). As can be obvious from FIG. 5, an average value of the reflectivity R in the prior art (2) is about 0.25 [%] in a range of 350 [nm]–750 [nm] of the wavelength λ, while an average value of the reflectivity R in this embodiment is extremely low, that is, about 0.8[%]. That is, according to the first embodiment, it is possible to obtain a higher antireflection effect than that in the prior art (2). In addition, the aspect ratio S in the simulation is smaller than that in the prior art (2). Accordingly, making the aspect ratio S larger by heightening the height H of each protrusion 20 offers an expectation of obtaining a higher antireflection effect.

Furthermore, the protrusions 20, 20, . . . can be formed by injection molding and therefore, it is possible to maintain higher endurance than the prior art (1).

Figure 6:
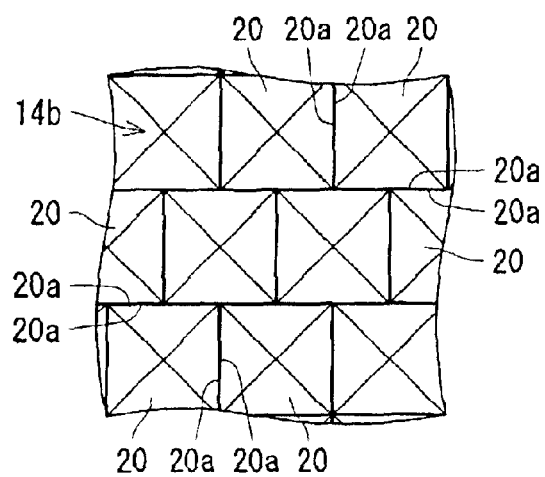
FIG. 6 is an illustrative view showing another example of a protrusion in FIG. 1 embodiment.

It is noted that although the protrusions 20, 20, . . . are formed in a matrix fashion as shown in FIG. 3 in the first embodiment, it is not limited thereto. That is, the respective protrusions 20, 20, . . . may be formed so as to be deviated in position with each other as shown in FIG. 6 so long as they can fully cover the whole lower surface 14b of the light guide plate 14 with no spaces.

Figure 7:
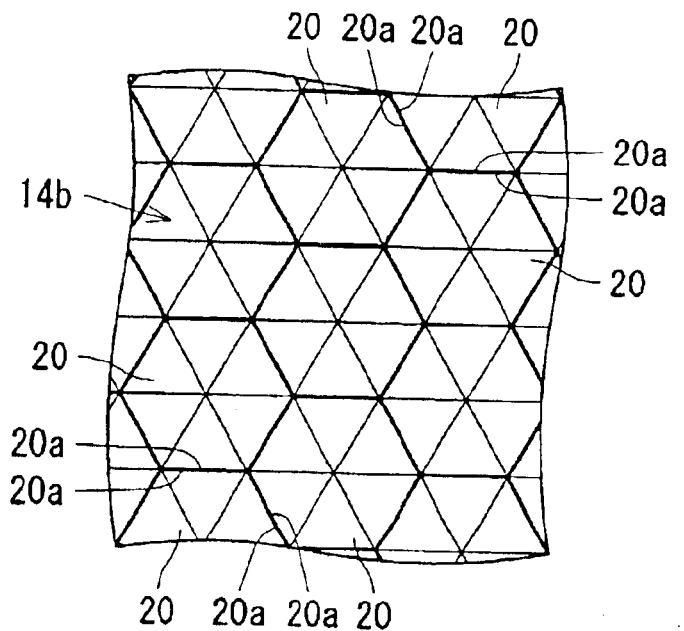
FIG. 7 is an illustrative view showing still another example of a protrusion in FIG. 1 embodiment.

Furthermore, a shape of each of the protrusions 20, 20, . . . is not limited to a quadrangular pyramid, a triangular pyramid or a polygonal pyramid more than a pentagonal pyramid may be available. FIG. 7 shows one example in a case each of the protrusions 20, 20, . . . is a hexagonal pyramid in shape. In this case, by forming the protrusions 20, 20, . . . in a honeycomb shape (arrangement), the whole of the lower surface 14b of the light guide plate 14 can be fully covered by the protrusions 20, 20, . . . with no spaces.

Figure 8:
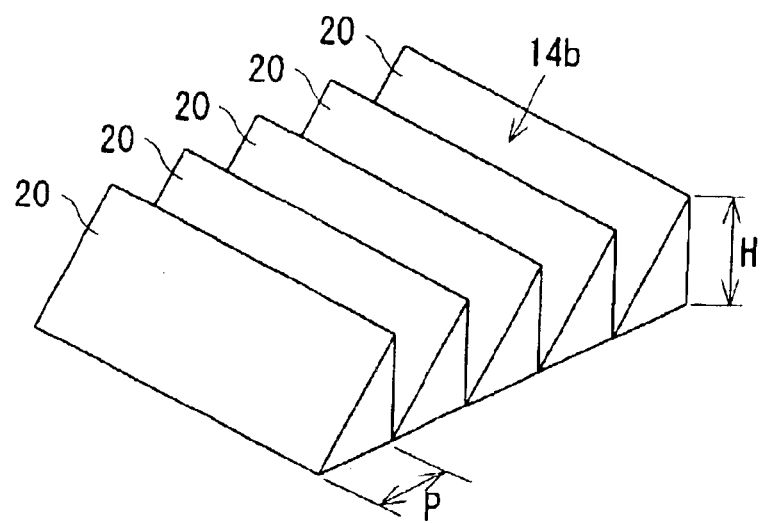
FIG. 8 is an illustrative view showing a further example of a protrusion in FIG. 1 embodiment.

In addition, as shown in FIG. 8, the protrusions 20, 20, . . . may be formed in an elongated mountain chain shape. More specifically, linear protrusions 20, 20, . . . having a triangle shaped cross-section in the longitudinal direction is successively formed such that adjacent protrusions in a width direction come into contact with each other. In this case also, making a height H of each protrusion higher with respect to a space between the protrusions 20, 20, . . . (which is equal to a length of a base of the triangle-shaped cross-section of the protrusion 20 in the longitudinal direction, herein), i.e. pitch P, i.e., making an aspect ratio S larger, a higher antireflection effect can be obtained.

Furthermore, although not shown in Figure, the protrusions 20, 20, . . . may be formed in a manner that a cross-section shape of each protrusions is made a stairs-shape.

Then, although the protrusions 20, 20, . . . are formed on the lower surface 14b of the light guide plate 14 in the first embodiment, protrusions similar thereto may be formed on the side surface 14a as an incident surface. By forming the protrusions on the incident surface 14a, it is possible to obtain an antireflection effect on the incident surface 14a and therefore, it is possible to improve a luminance on a screen. Also, protrusions similar to the protrusions 20, 20, . . . may be formed on the upper surface 14c, especially the slopes 18b, 18b . . . of the light guide plate 14. In this case also, it is possible to improve the luminance on the screen.

In addition, although the light guide plate 14 is made of acrylic resin in the first embodiment, another resin having transparency such as polycarbonate (PC) and etc. is available. Although a cold-cathode tube is utilized as the linear light source 12, it is not limited thereto, and another fluorescent lamp such as a hot-cathode tube and etc., light emitting diodes arranged in a linear manner, or an incandescent lamp or an organic light-emitting member arranged in a linear manner may be used.

Figure 9:
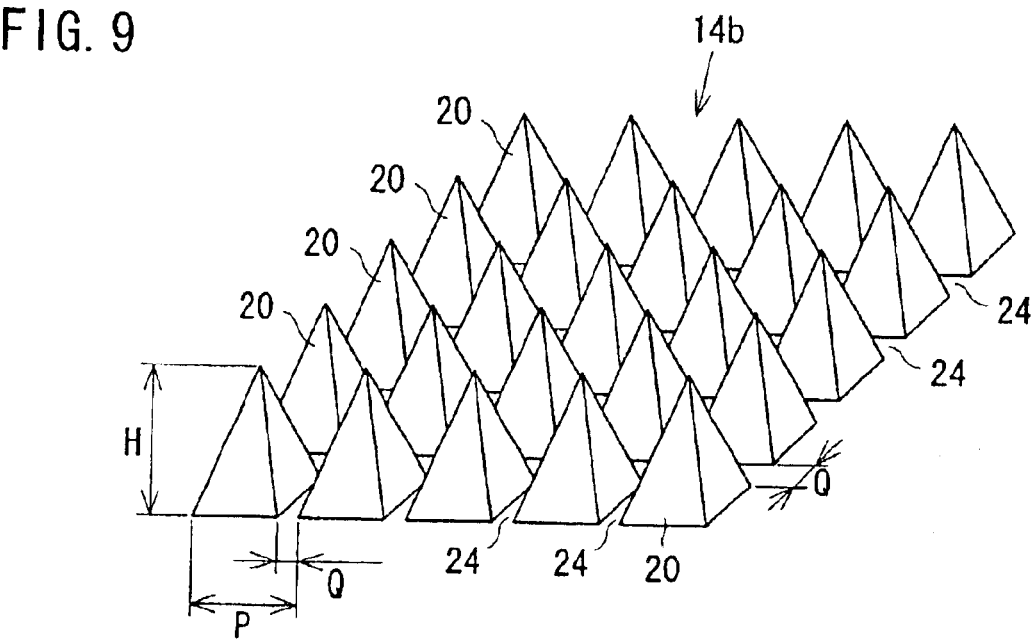
FIG. 9 is a perspective view showing in an enlarged manner a lower surface of a light guide plate in a second embodiment of the present invention.
Figure 10:
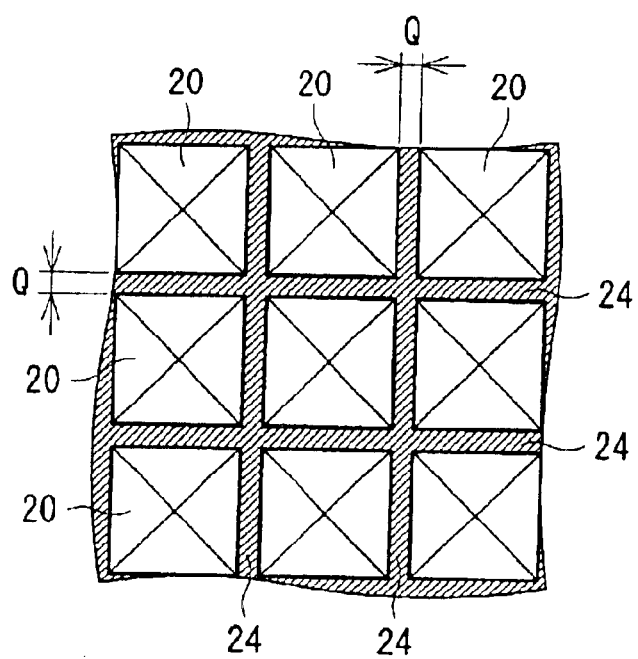
FIG. 10 is an illustrative view when looking up at the lower surface of the light guide plated shown in FIG. 9.

Next, a description is made on a second embodiment of the present invention. In the second embodiment also, a number of quadrangular pyramid-shaped protrusions as shown in above-described FIG. 2 are formed on the lower surface 14b of the light guide plate 14. It is noted that in the second embodiment, respective protrusions 20, 20, . . . are formed at spaces or intervals Q from each other (FIG. 9 also is similarly to FIG. 2 opposite in up and down direction to FIG. 1). More specifically, as shown in FIG. 10, the respective protrusions 20, 20, . . . are formed in a matrix fashion. Then, adjacent protrusions 20, 20, . . . are formed such that respective sides 20a and 20a are opposed (in parallel) to each other at a fixed space or interval Q. According to such the structure, a clearance 24 in a matrix fashion shown by oblique lines in FIG. 10 is formed between the respective protrusions 20, 20, . . . .

It is noted that an area of the clearance 24 is restricted. More specifically, a ratio of the clearance 24 to the whole of the lower surface 14b of the light guide plate 14 (strictly, whole effective area) is made lower than 10[%]. In other words, a ratio of a portion covered by the protrusions 20, 20, . . . to the whole lower surface 14b is made more than 90[%]. Furthermore, the aspect ratio S (=H/P) of each of the protrusions 20, 20, . . . is made more than 1.

Figure 11:
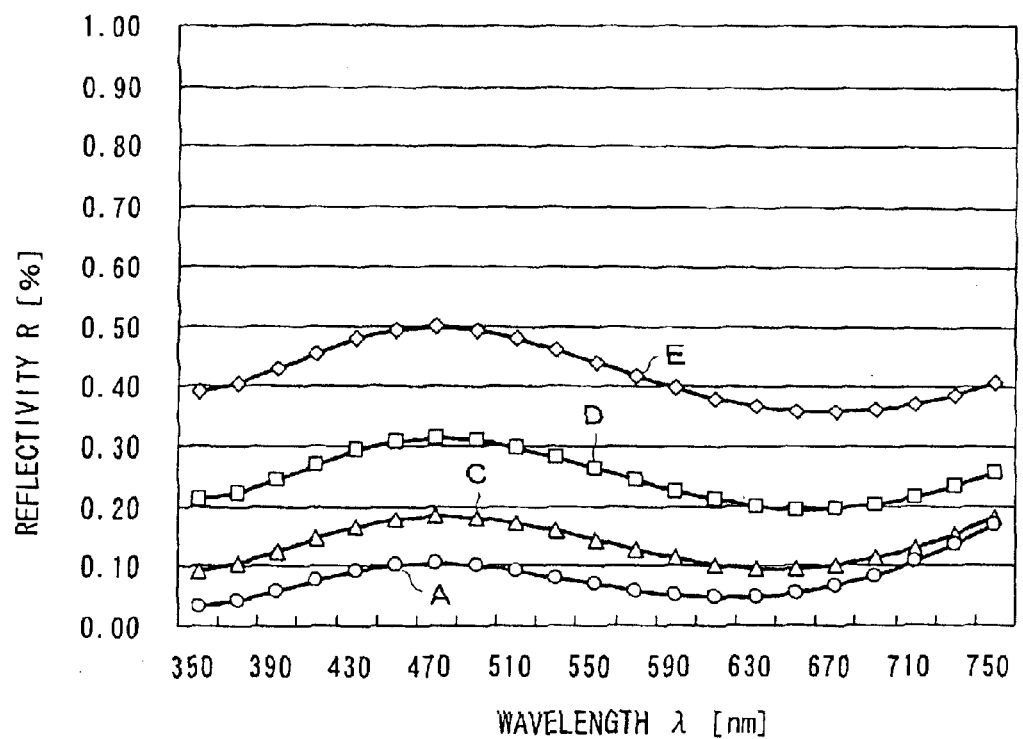
FIG. 11 is a graph showing a simulation result of a reflectivity with respect to wavelengths of lights on the lower surface of the light guide plate in FIG. 9 embodiment.

In the second embodiment, by restricting an area of the clearance 24 between the protrusions 20, 20, . . . (strictly, a ratio of an area of the clearance 24 to the whole area of the lower surface 14b of the light guide plate 14) and by restricting a lower limit value of the aspect ratio S of each of the protrusions 20, 20, . . . , even if the lower surface 14b of the light guide plate 14 is not fully covered by the protrusions 20, 20, . . . with no spaces, a relatively high antireflection effect can be obtained. FIG. 11 shows a simulation result of an effect caused by restricting the area of the clearance 24. It is noted that in the simulation, a calculation is made rendering the aspect ratio S of each of the protrusions 20, 20, . . . as 1.

In FIG. 11, a line A plotted with circles (○) shows a relationship between the wavelength λ and the reflectivity R in a case of no clearance 24 in the same manner as the above-described line A in FIG. 5. A line C plotted with triangles (Δ), a line D plotted with quadrangles (□), and a line E plotted with rhombuses (◇) show relationships between the wavelength λ and the reflectivity R in a case a ratio of the clearance 24 to the lower surface 14b of the light guide plate 14 is 10[%], 20[%] and 30 [%], respectively. As can be understood from FIG. 12, the smaller the area of the clearance 24 is, the higher the antireflection effect can be obtained. Then, when the aspect ratio S of each of the protrusions 20, 20, . . . is 1, if a ratio of the clearance 24 to the lower surface 14b of the light guide plate 14 is made equal to or less than 10[%], i.e., more than 90[%] of the lower surface 14b of the light guide plate 14 is covered with the protrusions 20, 20, . . . , it is apparent that a higher antireflection effect can be obtained than in the prior art (2) (line B in FIG. 5). It is noted that in the prior art (2), a ratio of a clearance 8 between protrusions 7, 7, . . . to a lower surface 3b of a light guide plate 3 becomes necessarily 21.5[%] due to a shape of each of the protrusions 7, 7, . . . .

Figure 12:
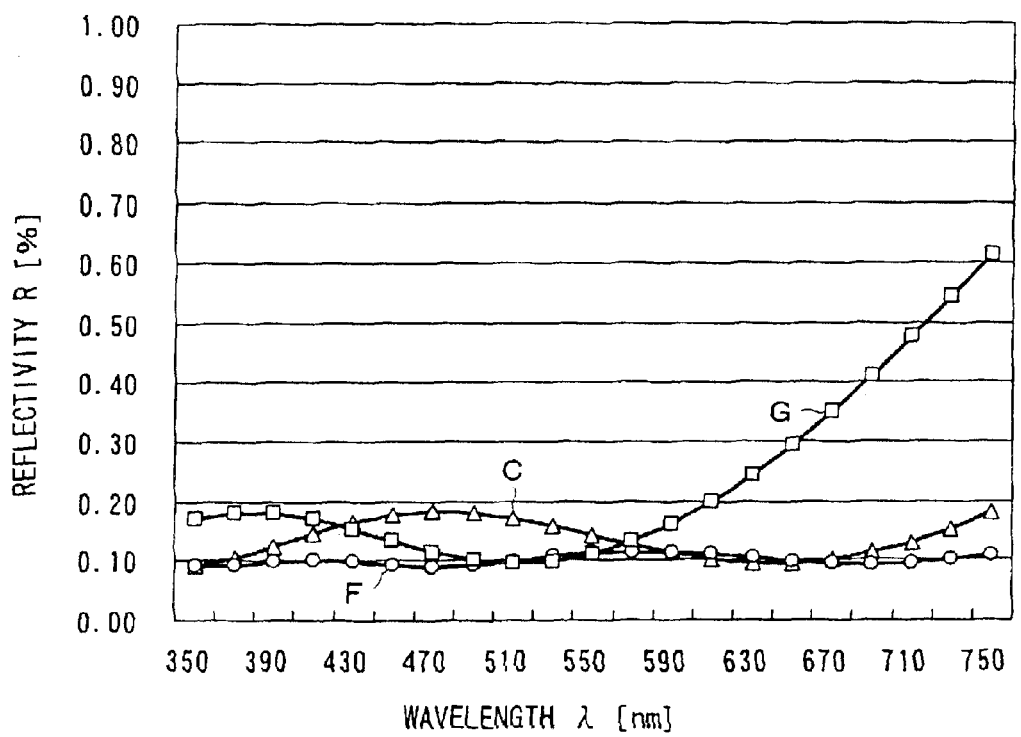
FIG. 12 is a graph showing a simulation result under a condition different from FIG. 11.

FIG. 12 shows a simulation result of an effect caused by increasing the aspect ratio S of each of the protrusions 20, 20, . . . . Noted that a calculation is performed rendering a ratio of the above-described clearance 24 to the lower surface 14b of the light guide plate 14 as 10[%].

In FIG. 12, a line C plotted with triangles (Δ) shows a relationship between the wavelength λ and the reflectivity R in a case of rendering the aspect ratio S of each of the protrusions 20, 20, . . . as 1 in the same manner as the line C in FIG. 11. Then, a line F plotted with circles (○) and a line G plotted with quadrangles (□) show relationships between the wavelength λ and the reflectivity R in a case of rendering the aspect ratio S as 3 and 0.8, respectively. As can be understood from FIG. 12, by making the aspect ratio S of each of the protrusions 20, 20, . . . larger, scattering in reflectivity R can be prevented at each wavelength λ. In other words, it is possible to obtain a stable reflectivity R at each wavelength λ. On the other hand, a small aspect ratio S causes a change of the reflectivity R depending upon wavelengths λ and causes an extreme rise in the reflectivity R according to circumstances (e.g., in an area of long wavelength for the line G).

According to the second embodiment, even if the whole of the lower surface 14b of the light guide plate 14 is not fully covered by the protrusions 20, 20, . . . , by restricting the condition of the protrusions 20, 20, . . . , a higher antireflection effect can be obtained than in the prior art (2).

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A light guide plate having a surface, comprising:
a plurality of protrusions which are formed on said surface with a pitch shorter than a wavelength of a light, each having a cross-section shape that a width is made gradually narrower, wherein a space between bases of adjacent protrusions is uniform.

2. A light guide plate according to claim 1, wherein said space is zero.

3. A light guide plate according to claim 1, wherein a ratio of a height of each of said plurality of protrusions to said pitch is more than 1 and a total area of bottoms of said plurality of protrusions to an area of said surface is more than 90%.

4. A light guide plate according to any one of claims 1 to 3, wherein each of said plurality of protrusions is formed in a pyramid shape.

5. A light guide plate according to any one of claims 1 to 3, wherein each of said plurality of protrusions is formed in a linear manner.

6. A light guide plate having a surface, comprising:
a plurality of protrusions which are formed on said surface with a pitch shorter than a wavelength of a light, each protrusion having a cross-section shape that a width is made gradually narrower, wherein a ratio of a height of each of said plurality of protrusions to said pitch is more than 1 and a total area of bottoms of said plurality of protrusions to an area of said surface is more than 90%.

7. A display device, comprising:
a light guide plate having a surface and a lower surface;
a plurality of protrusions which are formed on said surface with a pitch shorter than a wavelength of a light, each protrusion having a cross-section shape that a width is made gradually narrower, a space between bases of adjacent protrusions being uniform; and a liquid crystal display panel provided below said lower surface.

8. A display device, comprising:

a light guide plate having a surface and a lower surface;

a plurality of protrusions which are formed on said surface with a pitch shorter than a wavelength of a light, each protrusion having a cross-sections shape that a width is made gradually narrower, a ratio of a height of each of said plurality of protrusions to said pitch being more than 1, a total area of bottoms of said plurality of protrusions to an area of said surface being more than 90%; and a liquid crystal display panel provided below said lower surface.

* * * * *